(12) United States Patent
Walther

(10) Patent No.: US 6,789,989 B2
(45) Date of Patent: Sep. 14, 2004

(54) SCREW HAVING A HEAD WITH CONCAVE UNDERSIDE

(76) Inventor: Uli Walther, 1812 West Riverdale Road, Thunder Bay, Ontario (CA), P7C 4T9

( * ) Notice: Subject to any disclaimer, the term of this patent is extended or adjusted under 35 U.S.C. 154(b) by 150 days.

(21) Appl. No.: 10/097,446

(22) Filed: Mar. 13, 2002

(65) Prior Publication Data

US 2003/0175093 A1 Sep. 18, 2003

(51) Int. Cl.[7] ............................ F16B 23/00; F16B 35/06
(52) U.S. Cl. .................... 411/186; 411/369; 411/371.1; 411/403
(58) Field of Search ................................. 411/368, 369, 411/184, 186, 189, 371.1, 542, 403

(56) References Cited

U.S. PATENT DOCUMENTS

| | | |
|---|---|---|
| 951,437 A | 3/1910 | Gehrke |
| 2,226,491 A | 12/1940 | Gustafson |
| 2,752,814 A | 7/1956 | Iaia |
| 3,087,370 A | 4/1963 | Iaia |
| 3,175,454 A | 3/1965 | Morse |
| 3,241,422 A * | 3/1966 | Heimovics ............... 411/542 X |
| 3,247,752 A * | 4/1966 | Greenleaf et al. ........... 411/542 |
| 3,399,589 A * | 9/1968 | Breed ...................... 411/542 X |
| 3,469,490 A | 9/1969 | Pearce, Jr. |
| 4,460,300 A | 7/1984 | Bettini et al. |
| 4,701,088 A | 10/1987 | Crull |
| 4,802,388 A | 2/1989 | Roberts |
| 4,875,818 A | 10/1989 | Reinwall |
| 5,156,509 A | 10/1992 | Wu |
| 5,622,464 A * | 4/1997 | Dill et al. ............... 411/369 X |
| 5,919,020 A | 7/1999 | Walther |
| 6,231,286 B1 | 5/2001 | Bogatz et al. |

FOREIGN PATENT DOCUMENTS

| | | |
|---|---|---|
| GB | 929176 | 6/1963 |
| WO | 9522701 | 8/1995 |
| WO | 0005509 | 2/2000 |

OTHER PUBLICATIONS

Advertisement (undated) from Sealtite.

* cited by examiner

Primary Examiner—Neill Wilson
(74) Attorney, Agent, or Firm—David L. Davis

(57) ABSTRACT

An integrally formed screw, such as a wood screw has a threaded cylindric stem and a head (9). At least a part (25) of the head (9) is shallowly convexly curved (25) and is provided with a screwdriver recess (26). The head (9) has an annular, shallowly concave underside (22) adapted to accommodate a relatively soft, polymeric washer (27).

18 Claims, 3 Drawing Sheets

SCREW HAVING A HEAD WITH CONCAVE UNDERSIDE

FIELD OF INVENTION

The present invention relates to an integrally formed screw such as a woodscrew. Wood screws are used in many different applications. Some applications require a wood screw combined with a soft, polymeric washer. In such applications, it is often required that when the screw and the polymeric washer is in place, the screw head be as unobtrusive as possible in order to avoid damage to the screw head or other problems when working on the surface from which the screw heads project, e.g. when shoveling snow from the roof.

The known screws have a flat underside which engages the polymeric washer. The flat underside often causes a non-uniform deformation of the soft washer whereby the sealing or locking performance of the washer is lost or reduced.

My U.S. Pat. No. 5,919,020 describes a wood screw in which the specific pressure exerted by the screw head on a workpiece is relatively low, the fastening force high and the top surface of the head relatively unobstructive. This is achieved by combining the shape of a round head screw with an integrally formed radial extension resembling a washer having a flat underside. While this type of screw enjoys a considerable commercial success, in use with a polymeric, e.g. rubber washer the disadvantages mentioned in the preceding paragraph could be encountered.

SUMMARY OF INVENTION

It is an object of the present invention to provide a screw, particularly, but not exclusively, a wood screw, which would avoid or at least reduce the problem of undesired lack of uniformity of compression of a soft washer while securing the unobtrusive state in a fully applied condition and providing strength sufficient for use with power screwdrivers.

In broad terms, the invention provides an integrally formed screw having a circular head defining a peripheral rim, and an integrally formed stem which includes a thread formed in at least a part thereof. The stem has a root end at the head of the screw, and a free end portion. The head includes an underside from which the stem projects. The top surface portion of the head, facing away from the stem, includes a screwdriver engaging recess. An annular underside of the head is disposed about the root end of the stem. In accordance with the invention, the underside of the head defines a shallowly concave annular portion co-axial with the stem and decreasing in depth in the radial direction toward the circumference of the head.

BRIEF DESCRIPTION OF THE DRAWINGS

The invention will now be described by way of a preferred and an exemplary embodiments, it being understood that many other embodiments may exist which differ from those described, without departing from the present invention.

In the drawings:

FIG. 2 is a cross-sectional view of a polymeric washer used with the screw of

DETAILED DESCRIPTION

Figure 1:
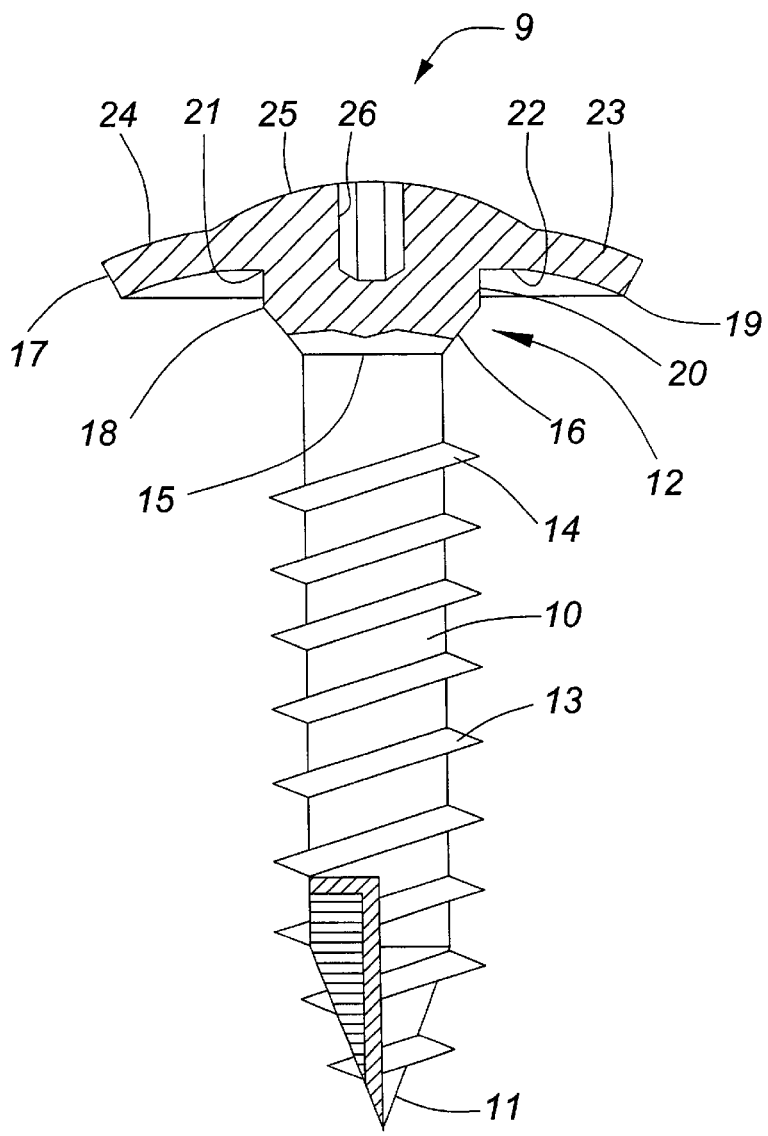
FIG. 1 is a diagrammatic, not-to-scale enlarged side view, partly in section, of a wood screw including the combination of features according to the present invention.
Figure 2:
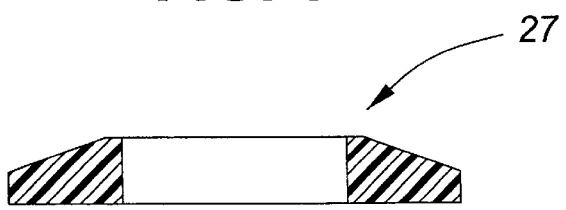

The screw shown in the drawings is an integrally formed product usually made from suitable steel, it being understood that certain applications may warrant or require different material, e.g. nylon.

The screw shown in the drawings comprises a stem having, in the embodiment shown, a cylindric portion 10 (also referred to as "main section"). As is known, the stem has a free end portion 11 which, in the embodiment shown, is pointed. The opposite end of the stem is designated as a root end 12. In the embodiment shown, a major part of the stem is cylindric except for a reinforcement at the head and at the pointed free end portion 11 where the shape is conical. A helical thread 13 projects from the surface of the stem. The thread extends from the pointed free end portion 11 and terminates at a root end portion 14 of the thread 13, which is spaced from the reinforced root end 12 of the stem.

Preferably, but not necessarily, the reinforcement of the stem includes a minor base end 15 of a frustoconical portion 16. The opposite end of the frustoconical portion 16 defines a major base end 18. In the embodiment shown, the major base end 18 coincides with, and thus has the same diameter as a cylindric part 20. The reference numbers 15, 16, 18 and 20 thus combine to form one embodiment of what is generally referred to as a reinforcement portion of the stem.

The cylindric part 20 merges, at a merger 21, with a shallowly concavely formed, downwardly facing underside 22, also referred to as a "shallowly concave annular portion 22" which includes the underside of a washer section 23.

It is emphasized that the primary purpose of the reinforcement portion is to provide the screw with suitable strength for use with a power screwdriver. Therefore, the actual size or shape of the reinforcement portion is optional and may differ from what is shown in the drawings, without departing from the scope of the present invention. In certain embodiments, it may even be entirely eliminated leaving the diameter of the cylindric portion 10 uniform up to the underside 22 of the head.

Figure 4:
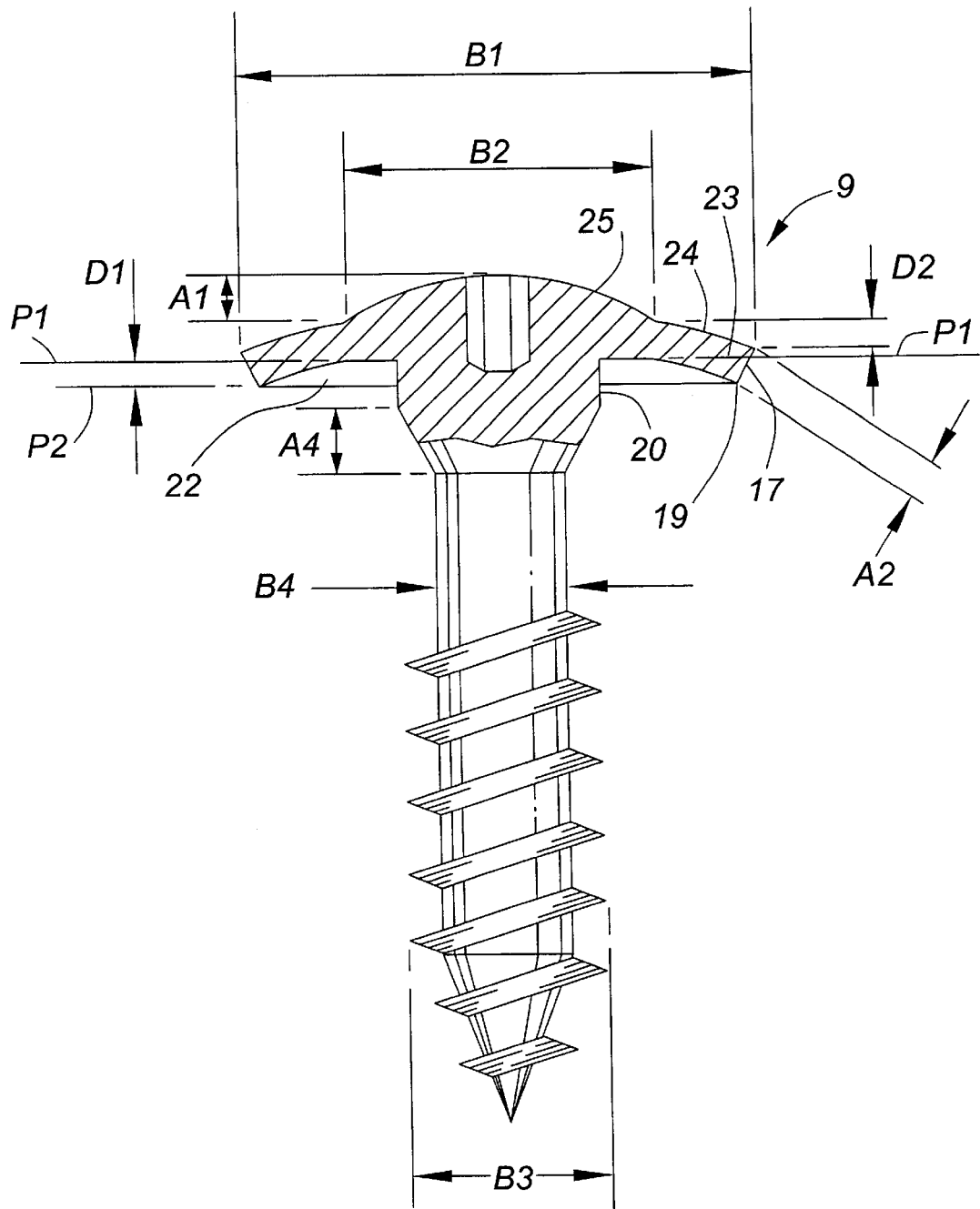
FIG. 4 is a diagrammatic, simplified view similar to that of FIG. 1 showing approximate measurements of different sizes of the screw of the present invention.

The term "shallowly" concavely formed refers to an annular concave underside 22 having the depth D1 of the order of about 0.5 mm in a screw whose head 9 has the outer diameter B1 of about 12 mm, the thickness A2 (FIG. 4) of the washer section 23 being in the order of about 1.5 to about 2 mm. Thus, the depth D1 of said shallowly concave annular underside 22 is about 6 to 8% of the outer diameter B1 of the head 9 of the screw. The top of the washer section 23 defines a shallowly generally frustoconical, annular upper face section 24. The reference to "generally" frustoconical includes embodiments (as shown in the drawings) where the surface may actually be somewhat convexly rounded due to the rolling process in the manufacture of the screw. In the embodiment of FIGS. 1 and 4 the axial height D2 of the generally frustoconical portion is about 1 mm. It is emphasized that the size figures refer to a typical size of a wood screw and are not to be interpreted as limiting the invention to the specific measures.

Reference number 17 designates the rim of the washer section 23. The rim 17 defines the outside diameter B1 of the head 9 of the screw. The deepest part of the shallowly concave underside 22 is disposed on a first reference plane P1 perpendicular to the stem of the screw. The lowermost part 19 or edge of the rim 17 presents a part of the head 9 which is located on a second reference plane P2, which is parallel with and is axially spaced from the first reference plane P1. The second reference plane P2 is closer to the tip 11 than the first reference plane P1. The depth D1 of about 0.5 mm referred to above is the axial between the reference planes P1, P2. The depth D1 is provided, for example, by rolling the top face 24 of the washer section 23 to change its shape from a planar to generally frustoconical.

A centrally disposed, coaxial, shallowly convex head portion or central portion having outer diameter or boundary B2 (FIG. 4), projects upwardly from the upper face section 24. The head portion 25 is provided with centrally disposed screwdriver engagement recess 26.

The term "shallowly convex" within the context of the central portion 25, designates an arrangement, wherein the maximum axial thickness A1 of the shallowly convex head portion 25 is only slightly larger than the thickness A2 of the washer section 23. In the embodiment shown, the thickness A1 is about 3 to 4 mm.

The screw of the present invention is intended for use with a polymeric washer 27 which does not form a part of the invention and is readily commercially available. The size of the washer 27 is selected to have the inner diameter roughly corresponding to the maximum diameter of the reinforcing portion 12. The washer is preferably bevelled at its end facing the underside 22 of the screw.

With particular reference to FIGS. 4, Table 1 presents three examples of different size embodiments of the screw of the present invention, having typical physical measurements. The three embodiments shown are 6, 7 and 8 mm which roughly corresponds to ¼'; ⁵⁄₁₆' and ⅜' wood screws each having a total length of about 80 mm, respectively. The respective size particulars of the screw.

TABLE 1

APPROXIMATE SIZE PARTICULARS OF ADDITIONAL EXAMPLES
OF THE INVENTIVE SCREW (in mm)

| Size of the screw | 8 | 7 | 6 |
|---|---|---|---|
| A1 thickness range of the head 25 | 2.4 | 2 | 1.6 |
| A2 thickness range of washer section 23 | 1.8–1.5 | 1.6–1.3 | 1.4–1 |
| A4 the length of frustocon. port. 16 | 2 | 2 | 1.5 |
| B1 diameter range of washer section 23 | 18.5–16 | 16.5–14 | 14–12.5 |
| B2 diameter range of head portion 25 | 10.5–10 | 10–9.7 | 9–8.7 |
| B3 outer dia. range of thread 13 | 8–7.5 | 7.2–6.7 | 6.2–5.7 |
| B4 diameter range of stem 10 | 5.4–5.1 | 4.82–4.79 | 4.24–4.18 |
| D1 depth of the shallowly concave underside 22 | 1.2 | 1.1 | 0.9 |
| D2 axial height of the frustoconical portion 24 | 1.4 | 1.2 | 1.1 |

It follows from the above that a wide range of the screws utilizing the present invention can be produced.

Figure 3:
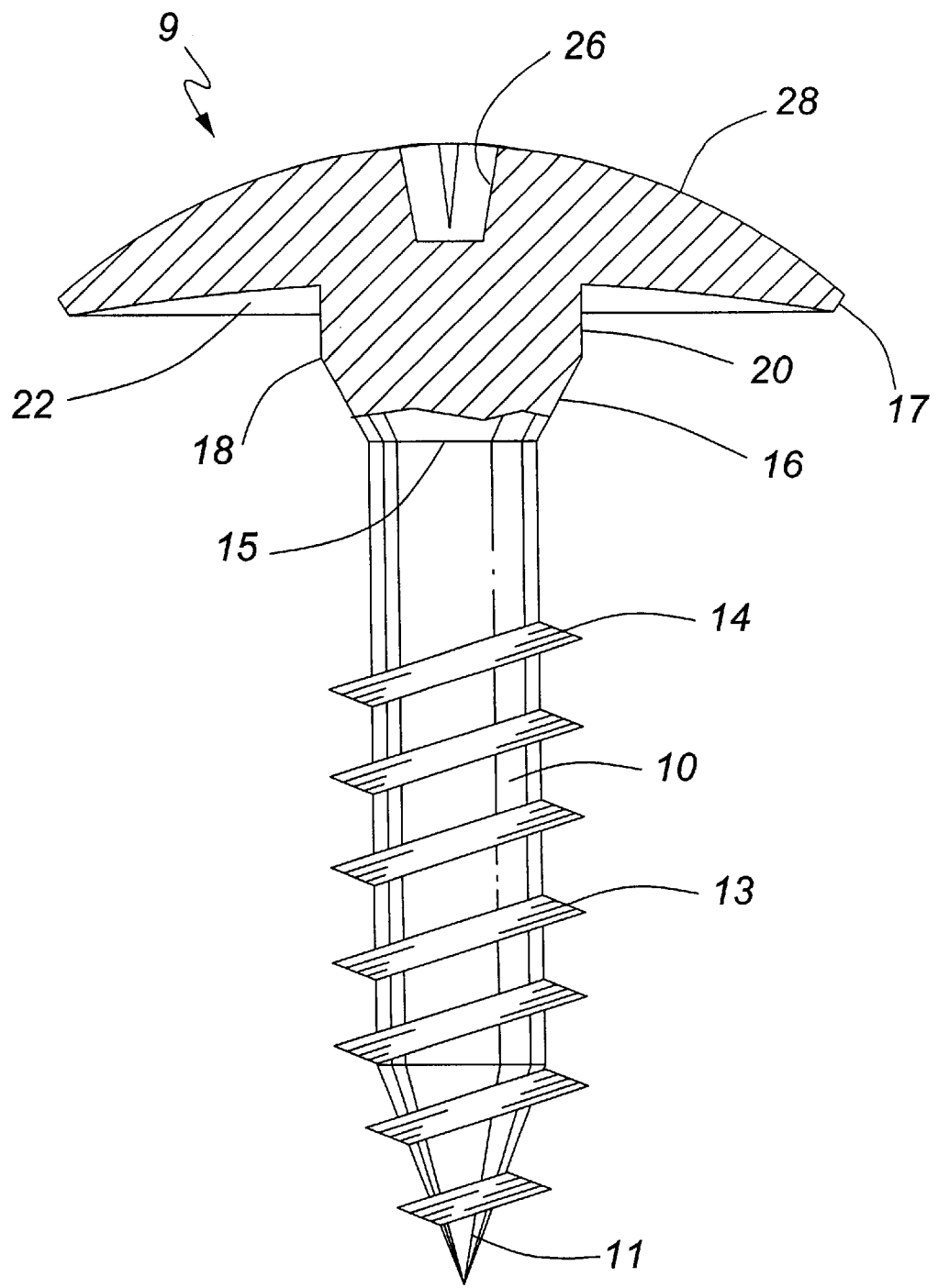
FIG. 3 is a view similar to that of FIG. 1 but showing a modified, exemplary embodiment of the invention.

Turning now briefly to the exemplary embodiment shown in FIG. 3, the concavely formed underside 22 is disposed under a continuously convex, rounded head 28 rather than a combined head and washer section portion described with reference to with FIG. 1.

As mentioned, the invention can be modified to a greater or lesser degree to differ from the embodiments disclosed, without departing from the scope of the present invention as set forth in the accompanying claims.

What is claimed is:

1. An integrally formed screw having a circular head including a peripheral rim and a stem which includes a thread formed in at least a part thereof;
    (a) the stem having a root end, and an opposed free end portion;
    (b) the head including a top surface portion facing away from the stem and including a screwdriverengaging recess; and an annular underside disposed about the root end of the stem;
    (c) the underside defining a shallowly concave annular portion co-axial with said stem and slightly decreasing in depth in the radial direction toward said rim;
    (d) the screwdriver engaging recess extending through the head and into the root end of the stem, the root end of the stem having a reinforced portion with sufficient diameter to substantially resist shear forces in the screwdriver engaging recess portion of the stem.

2. The screw of claim 1, wherein the root end merges with the underside at a merger located on a first reference plane (P1) perpendicular to the stem, and a part of the rim nearest the free end portion of the stem defines a perimeter section coincident with a second reference plane (P2) parallel with said first reference plane (P1); whereby the merger and the perimeter section, form a radially inner limit and a radially outer limit of said shallowly concave annular portion, respectively.

3. The screw of claim 1, wherein the depth of said shallowly concave annular portion is about 6 to 8% of the diameter of said head.

4. The screw of claim 1, wherein the depth of said shallowly concave annular portion is about 0.5 mm and the diameter of said head is about 12 mm.

5. The screw of claim 2, wherein the stem at said root end of the stem includes a reinforcement portion having a radial cross-sectional area larger than that of the rest of the stem, said reinforcement portion merging with the underside of the head portion at said first reference plane.

6. The screw of claim 1, wherein the root end merges with the underside of the head at a circular merger defining a first reference plane (P1) perpendicular to the stem, and a perimeter section of the rim nearest the free end portion coincides with a circular perimeter defining a second reference plane (P2) parallel with said first reference plane (P1), said second reference plane (P2) being closer to the free end portion, the distance between the first and second reference planes (P1, P2) defining the depth of said shallowly concave annular portion; and wherein the top surface portion of the head comprises a convexly curved central projection with a screwdriver engaging recess.

7. The screw of claim 6, wherein the central projection has a predetermined outer diameter (B2) which is smaller than the maximum diameter (B1) of said head, the top surface of the head further comprising an annular washer section disposed about and projecting generally radially away from the central projection, said washer section having a minor diameter coincident with said outer diameter (B2) of the central projection, and a major diameter which defines the outer diameter (B1) of the head.

8. The screw of claim 7, wherein said washer section is shallowly generally convexly curved or shallowly generally frustoconical and said underside is shallowly concave, to define at least a part of said shallowly concave annular portion.

9. The screw of claim 8, wherein the depth of said shallowly concave annular portion is about 8% to about 10% of the outer diameter (B1) of said head.

10. The screw of claim 8, wherein the outer diameter (B1) of said head is about 12 mm and the depth (D1) of said shallowly concave annular portion is about 0.5 mm.

11. An integrally formed screw comprising a head and a stem;
   (a) said stem including:
      (i) a generally cylindric stem portion having a tapering, pointed free end portion and a root end;
      (ii) a helical thread projecting from the surface of the cylindric stem portion and extending over at least a part of said tapering, pointed free end portion and over at least a part of the overall length of the cylindric stem portion located between said tapering, pointed, free end portion and said root end;
      (iii) said root end including a reinforcement portion having a radial cross-sectional area larger than that of the cylindric stem portion;
   (b) said head comprising:
      (i) an underside;
      (ii) a generally convex upper portion turned away from the stem and a washer section having a rim which defines the maximum diameter (B1) of the head;
      (iii) said washer section including a shallowly convex, generally frustoconical annular upper face section turned away from said underside, and a shallowly concave annular underside, the washer section having a major diameter which is a multiple of that of the reinforcement portion;
      (iv) a centrally disposed shallowly convex central portion projecting from said upper face section, and having a generally circular outer boundary coinciding with a minor diameter of said annular upper face section of the washer section;
      (v) said shallowly convex central portion being provided with a screwdriver engagement recess.

12. The screw of claim 11, wherein the root end merges with the underside of the head at a first reference plane (P1) perpendicular to the stem, and a part of the rim nearest the free end portion of the stem defines a circular perimeter coincident with a second reference plane parallel with said first reference plane; said second reference plane (P2) being closer to the free end portion of the stem than the first reference plane, whereby the merger and the circular perimeter define, respectively, a radially inner limit and a radially outer limit of said shallowly concave annular underside, respectively.

13. The screw of claim 11, wherein the depth of said shallowly concave annular underside is about 6 to 8% of the maximum diameter (B1) of said head portion.

14. The screw of claim 11, wherein the depth of said shallowly concave annular underside is about 0.5 mm and the diameter of said head portion is about 12mm.

15. An integrally formed screw comprising, in combination:
   (a) a stem comprising a cylindric main section merging with a tapering, pointed free end portion, and a root end;
   (b) a helical thread projecting from the surface of the main section, the thread extending over at least a part of said free end portion, to a point spaced from said root end;
   (c) said root end being defined by a reinforcement portion which merges with the main section at a minor base end of a frustoconical section;
   (d) said frustoconical section further including a major base end spaced from said minor base end, said major base end corresponding in diameter to and being coincident with a first end of a cylindric part of the reinforcement portion;
   (e) a second end of the cylindric part being coincident with a shallowly concave annular underside of a head of the screw, the head including a washer section which has a circular rim the diameter of which is a multiple of that of said cylindric part;
   (f) said cylindric portion defining a continuous cylindric wall extending throughout from said first end of the cylindric part to said second end thereof;
   (g) said washer section including a generally frustoconical, annular upper face section turned away from said shallowly concave annular underside, and a rim defining a maximum diameter of the head; and
   (h) a centrally disposed, shallowly convex head portion disposed centrally of the head and provided with a screwdriver engagement recess;
   (i) said shallowly convex head portion having an outer perimeter (B2) which coincides with an inner diameter of said annular upper face section.

16. The screw of claim 15, wherein:
   (a) the depth of said shallowly concave annular underside is about 0.5 mm;
   (b) the second end of the cylindric part merges with the shallowly concave annular underside at a merger defining a first reference plane (P1) perpendicular to the stem;
   (c) a part of said rim nearest the free end portion of the stem defines a lower edge coincident with a second reference plane (P2) parallel with said first reference plane (P1);
   (d) said second reference plane (P2) being closer to the free end portion of the stem than the first reference plane (P1);
   (e) the merger and the lower edge forming, respectively, a radially inner limit and a radially outer limit of said shallowly concave annular underside.

17. An integrally formed screw comprising, in combination:
   (a) a stem having a tapering, pointed free end portion, a generally cylindric main section, and a root end;
   (b) a helical thread projecting from the surface of at least a part of the free end portion and over at least a part of said main section;
   (c) said root end including a frustoconical portion having a minor base end coincident with the main section near the root end of the stem, and a major base end coincident with a first end of a generally cylindric portion;
   (e) the second end of the generally cylindric portion being coincident with a shallowly concave annular underside of a washer section having a diameter which is a multiple of that of the cylindric portion;

(g) said washer section including a generally frustoconical annular upper face section turned away from said underside;

(h) said upper face section merging, at an inner diameter (B2) thereof, with a shallowly convex central projection provided with a screwdriver engagement recess; and (i) the axial length (A1) of said central portion being only a fraction of the inner diameter (B2) of said annular upper central portion.

18. The screw of claim 17, wherein the ratio of the axial length (A1) of said central portion to the inner diameter (B2) of said annular upper face section of the washer section is about 0.2 to about 0.5, the axial distance between the inner (B2) and an outer (B1) diameter of the annular upper face section is about 1 mm and the depth of said shallowly concave annular underside is about 0.5 mm.

* * * * *